Dec. 27, 1927.  
W. G. ESTEP  
1,653,996  
VALVE  
Filed March 22, 1927

Inventor  
W. G. Estep  
By C. A. Snow & Co.  
Attorneys

Patented Dec. 27, 1927.

1,653,996

UNITED STATES PATENT OFFICE.

WILLIAM G. ESTEP, OF DUQUESNE, PENNSYLVANIA.

VALVE.

Application filed March 22, 1927. Serial No. 177,348.

This invention relates to valves designed for use in flush tanks, faucets and the like, one of the objects being to combine with the structure a check valve which is held normally unseated by a tapered plug constituting a guide for the main valve, it being possible, by removing or loosening the plug to allow the check valve to feed automatically, thereby cutting off the flow of fluid to the valve casing and permitting the main valve or some portion of the casing to be removed without escape of fluid.

A further object is to provide a valve of this type which is simple, durable and compact in construction and the parts of which can be readily assembled.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred forms of the invention have been shown.

In said drawings.

Figure 1:
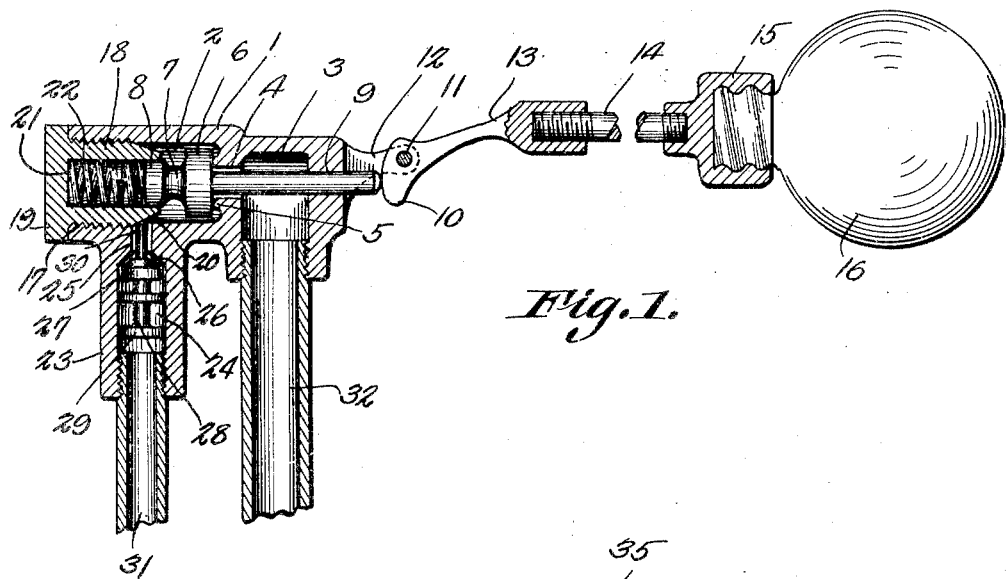
Figure 1 is a section through the casing and adjacent parts of a valve for use in a flush tank.

Referring to the figures by characters of reference 1 designates a valve casing provided with separate compartments 2 and 3 connected by a passage 4. A valve seat 5 is provided around this passage and within the compartment 2 for engagement by the main valve 6. This valve is in the form of a disk having a reduced stem 7 projecting therefrom and formed with a head or enlargement 8. An elongated stem 9 projects from the valve 6 through the passage 4 into the compartment 3 through one wall of the valve casing. Here the end of this stem is normally engaged by a cam 10 pivotally mounted at 11 within a bracket 12 extending from the valve casing. The cam is provided at one end of an arm 13 having an elongated rod 14 projecting therefrom. This rod has a socket member 15 secured to one end for engagement by a float 16 which can be formed of a glass bulb or can be of any other desired construction.

One end of the compartment 2 is interiorly screw threaded as shown at 17, this compartment opening through the wall of the casing 1. A screw plug 18 is insertible into the threaded portion of the compartment, this plug having a head 19 at one end while its other end, which is seated within the casing 1, is tapered as shown at 20. A socket 21 is provided in the plug and holds a coiled spring 22. The head of the valve 6 is slidably mounted in this recess and bears against the spring. Thus the spring serves to hold the valve seat normally pressed against its seat 5.

Extending at an angle to the casing 1 is an extension 23 having a compartment 24 therein communicating, through a passage 25, with the compartment 2. A valve seat 26 is formed by one end wall of the compartment 24 around the passage 25. Slidably mounted within this compartment is a tapered valve 27 having a stem 28 carrying spaced guide disks 29 or the like whereby the valve can be held properly centered. These disks, however, are so constructed as not to interfere with the flow of water or other fluid longitudinally of the compartment 24. A stem 30 projects from the valve 27 and through passage 25, this stem normally bearing against the tapered end 20 of the plug 18 at a point near the base of the taper where the plug is of greatest diameter. This valve 27 is held normally off of its seat 26 and fluid entering the compartment 24 through a supply pipe 31 will be free to flow into the compartment 2. If the float 16 is in lowered position, cam 10 will hold the valve 6 unseated against the action of spring 22 so that water can thus flow into the compartment 3 and thence through an outlet pipe 32 communicating with said compartment. When the float rises with the level of water within the tank, the valve 6 will be seated by spring 22 and the pressure of water behind the valve 6 will tend to hold said valve more firmly to its seat.

Should it be desired to repair the structure it is merely necessary to unscrew the plug 18. Thus the tapered portion 20 of the plug 18 will be shifted relative to the end of stem 30 and the pressure of water back of the valve 27 and its disks 29 will act to force valve 27 to its seat 26. Consequently the flow of water to the compartment 2 will be shut off. Thus the plug 18 can be removed bodily and the valve 6 and its stem 9 will also be removed from the compartment 2. Necessary repairs or replacements can then be made and when the plug 18 is reinserted the tapered end thereof will wedge against the end of the stem 30 and unseat the valve 27, thus restoring the parts to their working positions.

Figure 2:
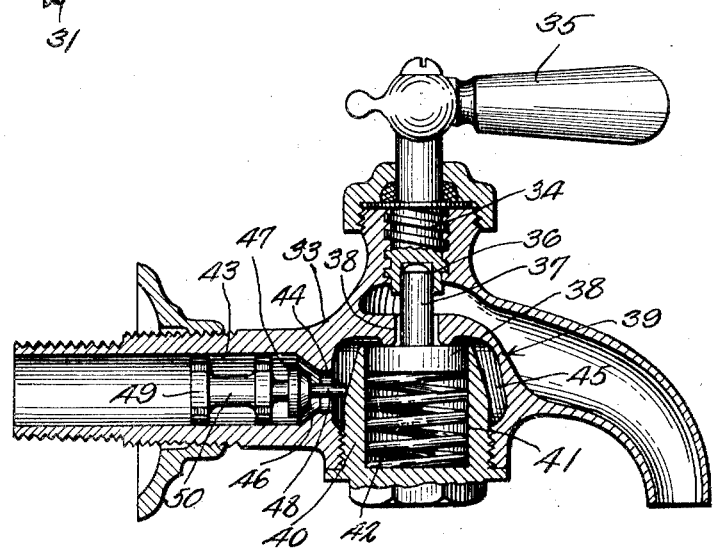
Figure 2 is a section through a faucet embodying the present improvements.

The same relative arrangement of parts can be utilized in a faucet construction as shown in Figure 2. In this structure the faucet 33 is shown provided with a threaded stem 34 having means 35 at its outer end whereby it can be rotated readily so as to be fed downwardly or upwardly within the faucet. The inner end of the stem has a socket 33 for the reception of the stem 37 of the main valve 38. This main valve is located at the intake end of the passage 38 in the partition 39 separating the inlet from the outlet of the faucet. A tapered screw plug 40 is removably mounted in the faucet and has a socket 41 in which a spring 42 is mounted. This socket constitutes a guide for the valve 38 and also serves to maintain the spring 42 in proper relation to the valve 38. The inlet compartment 43 of the faucet or valve casing communicates, through a passage 44 with the compartment 45 in which the main valve 38 is located. A valve seat 46 is located at one end of the compartment 43 and around the passage 44, this seat being adapted to be engaged by a check valve 47 having a stem 48 normally bearing against the tapered portion of the screw plug 40. The valve has guide disks or spiders 49 mounted on a stem 50 projecting from the valve. These disks or spiders do not interfere with the flow of liquid through the compartment 43. As shown in the drawing the tapered end of the plug 40 serves to hold the check valve 47 normally open. When the stem 34 is rotated in one direction the main valve 38 will be thrust against its spring 42 and away from its seat around the passage 38. Thus the flow of water will take place through the faucet from the inlet to the outlet thereof. Should it be desired to make repairs to the faucet it merely becomes necessary to unscrew the plug 40. Thus the tapered portion thereof will be withdrawn from engagement with the stem 48 and the pressure of fluid against the spiders or disks 39 and the valve 47 will cause said valve to move against its seat 46, thereby preventing the escape of water through the passage 44. Consequently the valve 38 and the parts associated therewith can be removed and repairs or replacements can be made. Thereafter the parts can be returned to their initial positions and the faucet used as before.

What is claimed is:

1. The combination with a valve casing having an inlet compartment, an outlet, and a valve compartment between the inlet compartment and the outlet, of a main valve for closing communication between the valve compartment and the outlet, a check valve for closing communication between the inlet compartment and the valve compartment, said valves being movable along intersecting lines, a tapered screw plug removably mounted within the valve compartment and constituting a guide for the main valve, said plug also constituting wedging means for holding open the check valve.

2. A device of the class described including a valve casing having an inlet compartment, a valve compartment and an outlet, a check valve for closing communication between the inlet compartment and the valve compartment, a main valve for closing communication between the valve compartment and the outlet, a tapered screw plug removably mounted within the valve compartment and normally holding the check valve unseated, there being a recess within the plug, a spring within the recess for holding the main valve normally to its seat, and means for unseating the main valve, said main valve being guided by the plug in its movement to and from its seat, the check valve being movable to its seat under pressure of fluid thereagainst when the screw plug is removed.

In testimony that I claim the foregoing as my own, I have hereto affixed my signature.

WILLIAM G. ESTEP.